E. A. BEHRENS.
PROCESS FOR MANUFACTURING CARBONIC ACID.
APPLICATION FILED AUG. 22, 1904.
960,788.
Patented June 7, 1910.
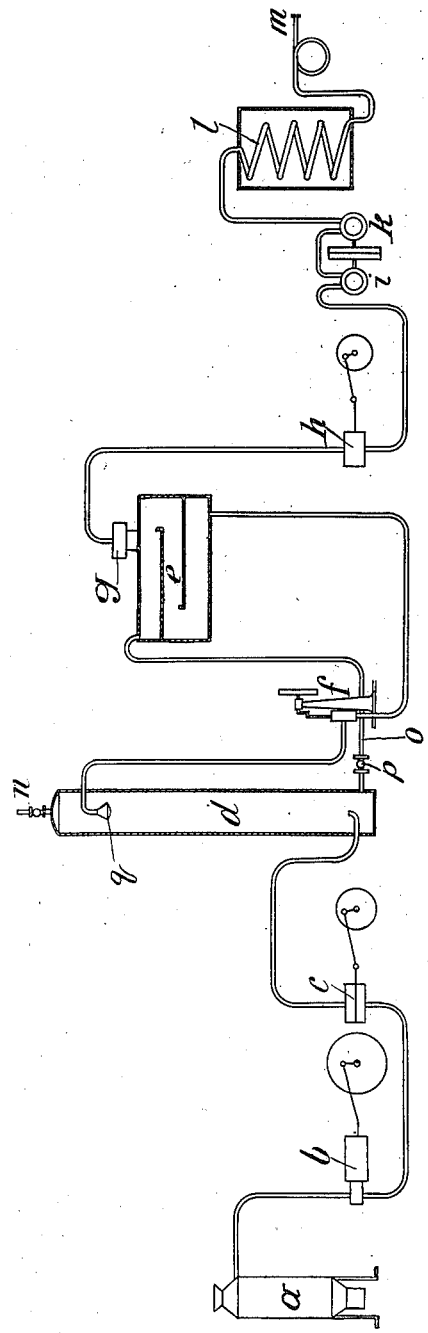
Witnesses:
M. A. Milord
W. B. Moore
Inventor:
Ernst August Behrens.
By Frederick Benjamin
Attorney.

UNITED STATES PATENT OFFICE.

ERNST AUGUST BEHRENS, OF BREMEN, GERMANY, ASSIGNOR TO MASCHINENFABRIK SÜRTH G. M. B. H., OF SÜRTH, NEAR COLOGNE, GERMANY.

PROCESS FOR MANUFACTURING CARBONIC ACID.

960,788.  Specification of Letters Patent.  Patented June 7, 1910.

Application filed August 22, 1904. Serial No. 222,112.

*To all whom it may concern:*

Be it known that I, ERNST AUGUST BEHRENS, a subject of the German Emperor, and resident of Bremen, Germany, have invented a certain new and useful Process for Manufacturing Carbonic Acid, of which the following is a specification.

In order to obtain from a gaseous mixture, for instance from the products of combustion of coke, pure carbonic acid, the gases, according to the processes in use until now, are put into contact with a solution containing 15–20% of carbonate of potassium at a temperature of 40° C. and under atmospheric pressure. The carbonic acid is thereby absorbed, by forming bicarbonate of potassium, while the non-combined gases escape. With a view of obtaining the carbonic acid, the solution of bicarbonate of potassium is heated to a temperature of about 100° C., whereby the carbonic acid is again separated and can be collected and liquefied by means of a compressor. The remaining solution of carbonate of postassium is afterward cooled down to about 40° and then again used for absorbing carbonic acid. It is therefore necessary in this process to cool alternatively the solution of salt in order to cause it to absorb the carbonic acid and to heat it again afterward with a view of separating the carbonic acid. It is evident that considerable quantities of heat are necessary for this purpose by reason of the great specific heat of the solution of salt. The great consumption of fuel considerably raises the price of production of the carbonic acid and constitutes an essential drawback of the described process. It is true that half of the heat necessary for heating the lye may be saved by the use of a counter current cooler wherein the cold saturated lye leaving the absorption apparatus is lead against the hot boiled lye which returns to the cooler so that, owing to the continuous circulation of the lye, equal volumes of hot and cold liquid are constantly put into contact in order to compensate for their difference of temperature. The other half of the heat necessary for the above stated object must however be supplied by fresh quantities of fuel. The latter item of expense is completely avoided when the present process is employed, the principle whereof consists in keeping the temperature of the salt solution constant at the same height, i. e. at the temperature of dissociation of the carbonate of alkali. The absorption of the carbonic acid at this high temperature is rendered possible by the fact that the combustion gases are forced under pressure into the salt solution while the separation of the carbonic acid is produced by a diminution of the pressure.

The practical execution can be carried out in the following manner when a continuous working is to be obtained. The absorption vessel, which is partly filled with the hot salt solution and which constantly remains under the same pressure, has at the top and at the bottom two openings; the combustion gases are pressed into the vessel through one of the bottom openings and yield their contents of carbonic acid to the solution of carbonate of alkali, while the remaining nitrogen escapes under pressure through one of the upper openings. The pressure in the absorption apparatus is held at a determined height by controlling the amount of escaping nitrogen by means of a valve. The other lower opening serves to cause the saturated solution to escape and the quantity of the latter must evidently be controlled with reference to the pressure existing in the absorption apparatus and this is also performed by a valve. As soon as the lye has passed through the valve, it flows into another vessel wherein atmospheric pressure exists. The lye owing to this relief of pressure yields at once at its high temperature the absorbed carbonic acid which is then conveyed to the compressor. The other upper opening serves for the introduction of the saline solution which has already been freed of gas and which is pressed in by means of a compressing pump so that the saline solution repeats the same way in a continuous manner.

Referring to the drawing which illustrates more or less diagrammatically one form of apparatus for carrying out my process, *a* indicates a generator in which any suitable carbonaceous material, such as coke, is subjected to incomplete combustion for the production of water gas or generator gas. The gas is led from the generator *a* to the power cylinder *b* of an explosive gas engine, where it is exploded in the presence of sufficient air to convert the CO in the gas to $CO_2$. It has been found in practice that such employment of an explosive engine furnishes almost the entire power necessary in the subsequent portions of the operation, and that the cylinder-cooling water of the explosive engine can be employed for maintaining the saline solution at the required temperature. The exhaust gases from the explosive cylinder $b$ are forced by a compressor $c$ under suitable pressure into the lower portion of a reservoir $d$. The compressor $c$ may be belted to the explosive engine, or driven in any other desired manner. The reservoir $d$ is partially filled with a solution of potassium carbonate, which is maintained at about 100° C., and the exhaust gases are forced therein by the compressor $c$ at a pressure sufficient above that of the atmosphere to cause a chemical union of the $CO_2$ with the potassium-carbonate at such temperature; the upper portion of the reservoir $d$ being provided with a relief valve $n$ to permit escape of the nitrogen of the exhaust gases which accumulates in the upper portion of said reservoir. A pipe $o$, leading from the lower portion of the reservoir $d$, conducts the solution to a tank $e$, where it flows over baffle-plates, and, owing to the reduction of pressure, gives up the $CO_2$ in a gaseous form; a valve $p$ being provided in the pipe $o$ for regulating the rate of flow therethrough. A pump $f$ is employed for withdrawing the solution from the tank $e$ and returning it under pressure through a spray nozzle $q$ to the upper portion of the reservoir $d$, thus establishing a continuous circulation of the solution between the reservoir $d$ and tank $e$. An aspirator and compressor $h$ is employed for drawing the $CO_2$ from the tank $e$ and forcing it under suitable pressure through the nipple $m$ to retorts or other receptacles, a series of purifiers and coolers $i$, $k$ and $l$ being interposed between the compressor $h$ and said nipple.

This method of absorption and setting free of the carbonic acid by pressure and relief of pressure without changing the temperature, allows of a considerable saving being realized in the manufacture; it must still be added that according to the physical conditions whereupon the present process is based, the absorption speed is considerably higher than in the known process and owing to this fact it is possible to work with considerably less lye. It follows therefrom that the dimensions of the installation are considerably reduced in comparison with the known installations.

It has been proposed to produce carbonic acid through the influence of a partial vacuum with or without a saline solution. Experiments show that at low temperatures the separation of carbonic acid from a solution of bicarbonate of potassium, even under a high vacuum is too slow to be of any industrial value. If the separation of the carbonic acid is produced by heating the saline solution, the latter must be cooled down before it can be again used for absorbing the carbonic acid. It might be supposed that the periodical heating of the lye, necessary in the above process would be comparatively inexpensive, since the heat of the coke burned with a view of obtaining carbonic acid could be used for that purpose. This supposition, however, would be incorrect, for the reason that in heating a given quantity of lye, the coke consumed would evolve more carbonic acid than could be absorbed by the lye thus heated, and the excess would consequently be lost.

Having now fully described my said invention what I claim and desire to secure by Letters Patent, is:—

1. A process for manufacturing carbonic acid, consisting in heating a solution of carbonate of alkali to a temperature adapted to secure dissociation of the bicarbonate, introducing under pressure to said solution while heated, gases containing carbonic acid, said pressure being proportioned to the temperature and strength of the solution, whereby the carbonate is converted into the bicarbonate, then reducing the pressure to effect the separation of the carbonic acid from the resultant liquid.

2. A process for manufacturing carbonic acid, consisting in heating a solution of carbonate of alkali to a temperature of from 95° C. to 105° C., introducing to said hot solution, gases containing carbonic acid with sufficient pressure to convert the carbonate into the bicarbonate, then reducing the pressure on the resultant liquid to release the carbonic acid.

3. The herein described process of manufacturing carbonic acid which consists in introducing under pressure gases containing carbon dioxid into a solution of carbonate of alkali; applying a constant heat to said solution whereby it is held at the temperature of dissociation, thereby converting the carbonate into a bicarbonate, and reducing the pressure upon the resultant liquid whereby carbonic acid is released.

4. The herein described process of manufacturing carbonic acid which consists in introducing under pressure gases containing carbon dioxid into a solution of carbonate of alkali; applying a constant heat to said solution whereby it is held at the temperature of dissociation, thereby converting the carbonate into a bicarbonate; reducing the pressure upon the resultant liquid whereby carbonic acid is released; and returning said solution for a repetition of the aforesaid treatment thereof.

5. The herein described process of manufacturing carbonic acid, which consists in heating solution of carbonate of alkali to a temperature adapted to secure dissociation of the bicarbonate, adding to the solution gases containing carbon dioxid under a pressure proportionate to the temperature and strength of the solution whereby the carbonate is converted into the bicarbonate, then reducing the pressure to effect the separation of the carbonic acid from the resultant liquid.

6. The herein described process consisting in converting a carbonate of alkali in solution into a bicarbonate by heating the solution to the temperature of dissociation and then adding gases under pressure containing carbon dioxid to the solution, removing the resultant liquid to a chamber in which atmospheric temperature prevails whereby carbonic acid is released, and returning the solution to the original chamber, into which it is sprayed under pressure.

In testimony whereof I have hereunto set my hand in presence of two witnesses.

ERNST AUGUST BEHRENS.

Witnesses:
R. WILLIAMS,
GREGORY PHELAN.